United States Patent [19]

Bergquist

[11] Patent Number: 4,608,866
[45] Date of Patent: Sep. 2, 1986

[54] SMALL COMPONENT HELIUM LEAK DETECTOR

[75] Inventor: Lyle E. Bergquist, Lakewood, Colo.

[73] Assignee: Martin Marietta Corporation, Bethesda, Md.

[21] Appl. No.: 711,228

[22] Filed: Mar. 13, 1985

[51] Int. Cl.$^4$ .............................................. G01M 3/20
[52] U.S. Cl. ..................................................... 73/40.7
[58] Field of Search ................... 73/40.7, 40; 62/55.5, 62/100, 268; 55/269

[56] References Cited

U.S. PATENT DOCUMENTS

| | | | |
|---|---|---|---|
| 3,246,505 | 4/1966 | Koehmstead et al. | 73/40.7 |
| 3,416,359 | 12/1968 | Durbin et al. | 73/40.7 |
| 3,578,758 | 5/1971 | Altshuler | 73/40.7 |
| 3,646,804 | 3/1972 | Myers | 73/40.7 |
| 3,690,151 | 9/1972 | Briggs | 73/40.7 |
| 3,738,158 | 6/1973 | Farrell | 73/40.7 |
| 3,762,212 | 10/1973 | Morley et al. | 73/40.7 |
| 3,769,806 | 11/1973 | Boissin et al. | 62/55.5 |
| 3,788,096 | 1/1974 | Brilloit | 62/55.5 |
| 3,824,839 | 7/1974 | Briggs | 73/40.7 |
| 3,888,111 | 6/1975 | Craig | 73/40.7 |
| 4,154,092 | 5/1979 | White et al. | 73/49.3 |
| 4,158,960 | 6/1979 | White et al. | 73/40.7 |
| 4,356,721 | 11/1982 | White et al. | 73/40.7 |
| 4,487,058 | 12/1984 | Mennenga | 73/40.7 |
| 4,492,110 | 1/1985 | Bergquist | 73/40.7 |

Primary Examiner—Stewart J. Levy
Assistant Examiner—Hezron E. Williams
Attorney, Agent, or Firm—Yount & Tarolli

[57] ABSTRACT

A small component leak detector is provided having (i) a vacuum chamber for receiving test objects, (ii) a cryogenic pump, and (iii) a mass detector. The cryogenic pump is capable of entrapping a purge carrier gas, such as nitrogen, but not entrapping a detecting gas, such as helium. The purge carrier gas is entrapped by the cryogenic pump and the mass detector detects any helium emitting from the test object. The process of detecting leaks using the foregoing apparatus in conjunction with a purge carrier gas, such as nitrogen, is also disclosed and claimed. The apparatus and process are especially designed for detecting leaks in small components, such as the hermetic seals of electronic components.

20 Claims, 1 Drawing Figure

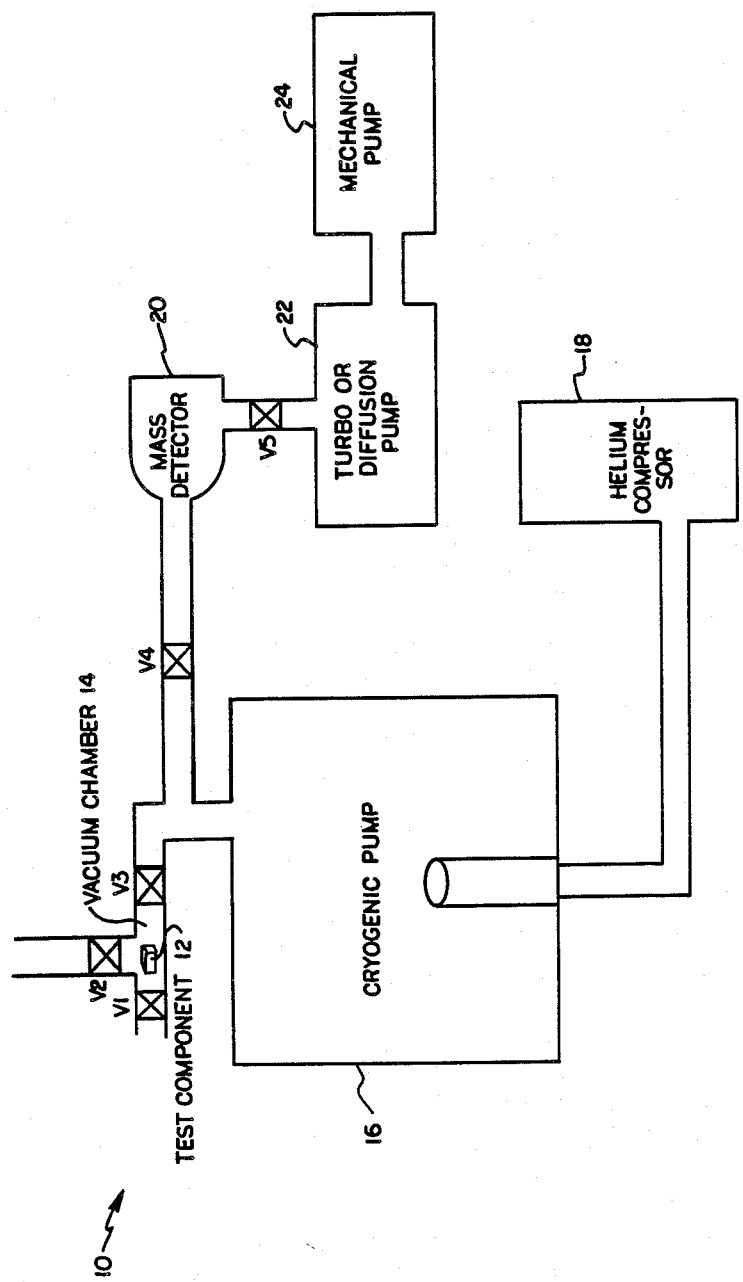

SMALL COMPONENT HELIUM LEAK DETECTOR

FIELD OF THE INVENTION

The present invention relates to a leak detector and a process for detecting leaks in test objects, especially for small components, such as electronic circuit components.

BACKGROUND OF INVENTION

The reliability of small electronic components depends to a great extent upon how well the component is hermetically sealed from reactive gases and water vapor. The test for determining the adequacy of the hermetic seal is important.

Presently, there are several methods for determining the leak rate in small electronic components. Several methods require that the electronic component be exposed or "bombed" with a gas. Usually, the gas is helium or sometimes argon or krypton. After exposing the electronic component for a specified time and pressure to the gas, the component is removed and tested for leaks. Breaks or defects in the hermetic seal are revealed by the gas which has infiltrated the component and which is detected as a "leak" when the gas flows out of a break or defect in the hermetic seal. Most tests are designed either for gross or large leaks or for fine or small leaks. The "bubble" test is frequently used as a gross leak test. In the bubble test, the device after having been exposed to the gas is submerged in a suitable liquid and visually inspected for the formation of bubbles indicative of a leak. See Myers U.S. Pat. No. 3,646,804 and Farrell U.S. Pat. No. 3,738,158. The bubble test has the obvious disadvantage of inadequate quantitative results and inability to detect small leaks.

Other gross leak test methods have also been used. One such method involves exposing a small electronic component to a gas and measuring the weight gain. Another involves exposing the component to a hydrocarbon gas and measuring the hydrocarbon vapor released while pressurizing the component with another gas.

Finally, leak tests on electronic components have employed mass spectrometers. One such device is illustrated in Altshuler U.S. Pat. No. 3,578,758. Although helium leak detectors have been used for fine leak testing small electronic components, one disadvantage is that present helium leak detectors are not totally suited for detecting larger leaks. If a component having a large leak is subjected to a helium leak detector, all the helium may be exhausted out of the component by the vacuum system before detection measurement. In any event, such a helium leak detector reduces the apparent size of a large leak. In general, present helium leak detectors for small electronic components have inadequate sensitivity dynamic range.

Another test which has been employed for detecting leaks in electronic components employes radioactive krypton. The components are exposed to radioactive krypton and then tests are made to determine if any radioactive emissions can be detected.

Getter pumps which have been employed in ultra sensitive leak detectors (e.g., Bergquist U.S. Pat. No. 4,492,110) have not been employed in leak detectors for small components since getters are unable to quickly handle the relatively large volume of purge carrier gas which must be employed in helium leak detecting small components.

Cryogenic pumps have been previously employed in creating vacuums. However, cryogenic pumps have previously not been employed as roughing pumps for leak detector systems. One deficiency of a typical cryogenic pump is that it is unable to handle a relatively large volume of purge carrier gas used in leak detecting small components. Adsorption of a large volume of gas warms up the cryogenic pump which results in desorption of the purge carrier gas. That in turn raises the pressure to an unacceptable level for the mass spectrometer. Secondly, cryogenic pumps adsorb helium and may later desorb helium which destroys the efficacy of the detection of helium by the mass spectrometer.

SUMMARY OF INVENTION

The present invention is directed to a leak detector comprising a vacuum chamber for receiving test objects to be subjected to leak tests. A mass detector, such as a mass spectrometer, is connected to the vacuum chamber. A modified cryogenic pump is also connected to the vacuum chamber. One feature of the present invention is that the modified cryogenic pump is capable of entrapping a purge carrier gas, such as nitrogen, but is not capable of entrapping the detecting gas, such as helium. A conventional cryogenic pump is modified for purposes of the present invention to entrap the purge carrier gas but not the detecting gas, helium.

Another feature of the present invention is that the internal vacuum system is constructed entirely of metal except for the electrical feed throughs for the mass detector. All internal passageways and connecting means are constructed of metal. Preferably, the connection means are flanges constructed of mating metal surfaces and metal gaskets.

The modified cryogenic pump employed in the present invention is generally kept at a temperature from about 16° K. to about 22° K., preferably from about 18° K. to about 20° K. A conventional cryogenic pump is modified for purposes of the present invention by (i) the addition of a heater to keep the cryogenic pump at the above specified temperatures, (ii) the addition of lead to the cooling surfaces, and (iii) the removal of any material, such as charcoal, which would absorb the detecting gas, helium.

The present invention is also directed to a process for detecting leaks in objects, such as small electronic components. The process of the present invention employs the foregoing apparatus and uses a purge carrier gas, such as nitrogen, to purge the vacuum chamber before introducing the electronic components. The purge carrier gas is necessary in order to eliminate the presence of any detecting gas, helium, in the chamber except for that which is carried by the test object. The modified cryogenic pump is then employed to evacuate the purge carrier gas into the cryogenic pump. Any helium leaking from the test object is kept in the gaseous phase within the cryogenic pump. A mass detector, such as a mass spectrometer, is then employed to detect the amount of helium leaked from the test object and kept in the gaseous phase in the cryogenic pump, thus indicating the presence of any leaks.

BRIEF DESCRIPTION OF DRAWING

The FIGURE schematically shows in block diagram form the small component helium leak detector of the present invention.

DETAILED DESCRIPTION OF PREFERRED EMBODIMENT

As shown in the FIGURE, a small component helium leak detector 10 is provided for detecting leaks in a test component 12. The test component 12 is positioned in a vacuum chamber 14. Access to the vacuum chamber 14 is achieved through valve V1.

The size of the vacuum chamber 14 may vary. Typically, the vacuum chamber would be from about 10 cc to about 300 cc. The preferred size is from about 80 cc to about 150 cc.

A cryogenic pump 16 is in gaseous communication with the vacuum chamber 14 through interconnecting passages. Vapor flow between the test chamber 14 and the cryogenic pump is controlled by a valve V3. The cryogenic pump 16 of the present invention includes a conventional helium compressor 18.

The cryogenic pump 16 of the present invention is a modified cryogenic pump which is designed to entrap a purge carrier gas, such as nitrogen, but not the detecting gas, such as helium. A conventional cryogenic pump is modified by adding a heater in order to keep the cryogenic pump at a temperature from about 16° K. to about 22° K., preferably from about 18° K. to about 20° K. A conventional cryogenic pump has charcoal designed to entrap helium. According to the present invention, the charcoal is removed from the cryogenic pump so as not to entrap the detecting gas, helium. The conventional cryogenic pump is further modified in order to add lead to the cooling fins or jet. This adds thermal mass to those surfaces. Lead has a much greater specific heat than copper at low temperatures and thus serves to quickly adsorb the heat of the nitrogen purge carrier gas without heating the system or raising the pressure for the mass detector. The modified cryogenic pump of the present invention can easily absorb the volume of purge carrier gas, such as 80 cc at atmospheric pressure, while keeping the temperature very steady except for minor perturbations less than one second.

As noted above, one feature of the present invention is to employ a cryogenic pump to entrap the purge carrier gas (nitrogen) but not helium. If only the charcoal (which adsorbs helium) is removed from an otherwise conventional cryogenic pump and the cryogenic pump is operated at its typical operating temperature, about 10° K., helium can stick to the nitrogen ice in the cryogenic pump. Thus, the modifications in acccordance with the present invention are designed to keep the cryogenic pump at a temperature from about 16° K. to about 22° K., preferably from about 18° K. to about 20° K. Above about 22° K., the cryogenic pump starts to desorb nitrogen. Below about 16° K., the cryogenic pump starts to entrap helium in the nitrogen ice.

When the cryogenic pump 16 fills up with frozen nitrogen, the cryogenic pump can be rejuvenated in accordance with normal and routine procedures.

A mass detector 20 is connected to the cryogenic pump and the vacuum chamber 14 through interconnecting passages controlled by a valve V4. The mass detector 20 can be a magnetic sector spectrometer or a quadrupole mass spectrometer, the latter being preferred.

The leak detector system 10 is evacuated by a turbo pump or a diffusion pump 22 backed up by a mechanical pump 24. The turbo pump 22 and the mechanical pump 24 are interconnected to the system, as shown in the FIGURE, through interconnecting passages in vapor communication with the mass detector 20. Those passages are controlled by a valve V5. A turbo pump is preferred over a diffusion pump since the turbo pump does not require liquid nitrogen. The primary function of the turbo pump 22 is to exhaust the system after helium exposure and detection by the mass detector 20.

Operation of the apparatus depicted in the FIGURE and the process of the present invention will now be described. A small component to be leak detected is exposed or bombed with the detecting gas, such as helium. Typically, the part is subjected to helium at a pressure from about 30 psi to about 60 psi. The purpose is to detect any helium that gets into any breaks in the hermetic seal and leaks back out during the test.

Initially, the valves V1 and V3 leading into the vacuum chamber are closed and the valve V2 is open. A purge carrier gas, such as nitrogen, is introduced through valve V2 into the vacuum chamber 14. The purge carrier gas is introduced at a pressure equal to or slightly above atmospheric pressure. While introducing the purge carrier gas through valve V2, the components to be leak tested are inserted into the vacuum chamber 14 by opening valve V1, which is typically a gate valve. Then both valves V1 and V2 are closed. Next, valve V4 is closed and valve V3 is opened. The nitrogen purge carrier gas is evacuated into the cryogenic pump 16. The cryogenic pump 16 entraps the nitrogen but does not entrap the helium. The helium which may be leaking from the test component remains in a gaseous phase and is accumulated within the cryogenic pump 16. The cryogenic pump 16 evacuates the vacuum chamber 14, and the system is ready for detection by the mass detector 20 in a time period from about 100 milliseconds to about one second.

Then valve V5 is closed and valve V4 is open. The mass detector 20 is then exposed and detects any helium which may have been emitted by the test object 12.

After detection is completed, valve V5 to the turbo pump 22 is opened and the turbo pump 22 evacuates the entire system. Next, valve V3 is closed and valve V2 is opened to purge the vacuum chamber 14. The purge at this point prevents any atmospheric gaseous materials, such as helium, from entering the system. Then, valve V1 is opened and the test object is removed.

In accordance with the present invention, the purge carrier gas can be nitrogen or any non-helium containing gas. Argon might possibly be employed as the purge carrier gas in accordance with the present invention, but care must be taken to ensure that argon does not entrap any helium because of its higher freezing point compared to nitrogen. Other helium free gases could be employed as the purge carrier gas so long as they will be entrapped by the cryogenic pump and will not entrap the detecting gas.

A preferred method for obtaining the purge carrier gas is to permit liquid nitrogen to evaporate. Allowing the liquid nitrogen to evaporate to form the purge carrier gas results in less helium impurities compared to using bottled nitrogen or feeding liquid nitrogen directly into the leak detecting system 10. Helium preferentially remains in the liquid nitrogen as nitrogen is allowed to evaporate. The resulting preferential evaporation of nitrogen results in a more pure nitrogen purge carrier gas. Obviously, the liquid nitrogen will not be allowed to entirely evaporate, and the remaining liquid containing preferential amounts of helium impurities will be discarded. Evaporated liquid nitrogen results in a purge carrier gas having helium impurities less than about one part per trillion.

Helium is employed as the preferred detecting gas in the present invention. Other detecting gases can be employed in the present invention, but helium is preferred because it has a much lower freezing point compared to the operating temperatures of the cryogenic pump and since it is inert and will not oxidize or corrode the leak detector system surfaces. For example, oxygen will oxidize the system surfaces. Helium is also preferred over explosive gases such as hydrogen.

Nonmetallic components in the leak detector system 10 are avoided since nonmetallic components can absorb and then desorb helium, thus contributing to undesirable background. Each of the valves identified in the FIGURE is constructed entirely of metal, and they are preferably pneumatically operated valves. Each of the connecting passages illustrated in the FIGURE is constructed entirely of metal. Preferably, all connecting means between valves and passages or between passages and functional units are constructed of mating flanges made of metal and metal gaskets.

The time for a test cycle is about 30 seconds. The number of components tested per cycle depends upon the size of the component, the size of the vacuum chamber 14, and the yield. For small components with a yield of 99.5%, 12 components is the most efficient number. If 12 components are tested per cycle, at least 1,000 components can be tested per hour. After 30 hours of testing, the cryogenic pump 16 could be filled and might require rejuvenation. Rejuvenation is accomplished by allowing the pump to warm up. The purge carrier gas is then vented to the atmosphere. The cryogenic pump 16 can be rejuvenated and returned to operation in less than about four hours.

A primary advantage of the present invention is that all the detecting gas, helium, is held in the volumetric region of the cryogenic pump 16 since commencement of the leak test cycle. This permits precise leak rate measurement and accommodates both gross leaks and fine leaks. Another advantage of the present invention is that the apparatus and process have a large sensitivity dynamic range encompassing leak rates from about 2 atm cc/sec to about $10^{-12}$ atm cc/sec. A further advantage of the present invention is that conductances (molecular volume flow) within the leak detector system are not a limitation. Unlike the bubble test and some of the other prior art leak detector systems for small electronic components, the apparatus and process of the present invention will not damage the electronic components. Moreover, the same leak detection system 10 can be used to detect both gross and fine leaks, thus simplifying available testing apparatus needed for leak checking small electronic components.

What is claimed is:

1. A leak detector for sensing a test gas leaking from a test object comprising:
   a vacuum chamber for receiving the test object which has been contacted by the test gas,
   a cryogenic pump connected to said vacuum chamber, said cryogenic pump having means for entrapping a purge carrier gas but not entrapping the test gas, and
   a mass detector connected to said vacuum chamber for detecting the test gas leaked from the test object.

2. A leak detector as claimed in claim 1 wherein the purge carrier gas is nitrogen and the test gas is helium.

3. A leak detector as claimed in claim 2 comprising internal connecting passages, said passages and said vacuum chamber forming an internal vacuum passage consisting of metal.

4. A leak detector as claimed in claim 3 wherein said leak detector has connection means and said connection means consists of metal-to-metal mating flanges, metal gaskets and internal metal passages.

5. A leak detector as claimed in claim 2 wherein said leak detector comprises an evacuation pump to evacuate the leak detector in preparation of a leak detecting cycle.

6. A leak detector as claimed in claim 5 wherein said evacuation pump is a turbo pump.

7. A leak detector as claimed in claim 2 wherein said cryogenic pump is operated at a temperature from about 16° K. to about 22° K.

8. A leak detector as claimed in claim 7 wherein said cryogenic pump is operated at a temperature from about 18° K. to about 20° K.

9. A leak detector as claimed in claim 2 wherein said cryogenic pump has a heater, has lead on at least a portion of its interior surfaces and is free of helium-entrapping material.

10. A leak detector as claimed in claim 1 wherein said vacuum chamber has a volume from about 10 cc to about 300 cc for receiving small electronic components.

11. A process for detecting a test gas leaked from a test object comprising:
    providing a vacuum chamber for receiving the test object,
    providing a cryogenic pump connected to said vacuum chamber which pump is capable of entrapping a purge carrier gas but not capable of entrapping the test gas leaked from the object,
    providing a mass detector connected to said vacuum chamber for detecting the test gas,
    purging said vacuum chamber by introducing the purge carrier gas into said vacuum chamber,
    introducing into said vacuum chamber the test object which has been contacted with the test gas,
    evacuating the purge carrier gas and any test gas leaked from said test object from the vacuum chamber by said cryogenic pump, and
    detecting the test gas leaked from the test object by a mass detector.

12. A process as claimed in claim 11 wherein said purge carrier gas is nitrogen and said test gas is helium.

13. A process as claimed in claim 12 wherein internal connecting passages are provided, said passages and said vacuum chamber forming an internal vacuum passage consisting of metal.

14. A process as claimed in claim 13 wherein connection means are provided and said connection means consists of metal-to-metal mating flanges, metal gaskets and internal metal passages.

15. A process as claimed in claim 12 comprising evacuating the vacuum chamber with an evacuation pump in preparation of a leak detecting cycle.

16. A process as claimed in claim 15 wherein said evacuation pump is a turbo pump.

17. A process as claimed in claim 12 wherein said cryogenic pump is operated at a temperature from about 16° K. to about 22° K.

18. A process as claimed in claim 17 wherein said cryogenic pump is operated at a temperature from about 18° K. to about 20° K.

19. A process as claimed in claim 12 wherein said cryogenic pump has a heater, has lead on at least a portion of its interior surfaces and is free of helium-entrapping material.

20. A process for detecting leaks as claimed in claim 11 wherein said test objects are small electronic components and said vacuum chamber has a volume from about 10 cc to about 300 cc.

* * * * *